United States Patent [19]

Weigele

[11] Patent Number: 4,967,442
[45] Date of Patent: Nov. 6, 1990

[54] APPARATUS FOR WASHING OR DRYING VEHICLES

[76] Inventor: Gebhard Weigele, Am Schoenblick 1a, 8902 Neusaess, Fed. Rep. of Germany

[21] Appl. No.: 343,530

[22] Filed: Apr. 26, 1989

[30] Foreign Application Priority Data

May 26, 1988 [DE] Fed. Rep. of Germany ... 8806860[U]

[51] Int. Cl.$^5$ .............................................. B60S 3/06
[52] U.S. Cl. .............................. 15/316.1; 15/DIG. 2; 15/97.1
[58] Field of Search ............ 15/9.7 B, DIG. 2, 316 R; 134/6

[56] References Cited

U.S. PATENT DOCUMENTS

| 4,166,302 | 9/1979 | Kim ...................................... 15/97 B |
| 4,166,303 | 9/1979 | Fromme ........................... 15/DIG. 2 |

FOREIGN PATENT DOCUMENTS 1188599  6/1985  Canada ................................ 15/97 B

*Primary Examiner*—Edward L. Roberts
*Attorney, Agent, or Firm*—Flynn, Thiel, Boutell & Tanis

[57] ABSTRACT

The apparatus for washing or drying vehicles has a conveyor belt drawing the vehicle through the apparatus and a flexible support member (4), guided in a horizontal plane above the plane of movement of the vehicle over a plurality of return wheels (5, 6), with a multiplicity of narrow strips (10) of absorbent material connected with said support member and vertically suspended therefrom. Two strands (4, 4b) of the support member (4) extend at an angle ($\alpha$) obliquely relative to the direction (B) of movement of the vehicle. The strand (4a) facing the front end of the vehicle is driven in a direction which has a velocity component (K1) oriented opposite to the direction (B) of the vehicle advance. That strand (4b) of the support member (4) which faces toward the tail (1b) of the vehicle is inclined at such an angle ($\alpha$) relative to the direction (B) of vehicle advance that its motion has a velocity component (K2) which is oriented in the direction (B) of the vehicle advance. This angle ($\alpha$) and the velocity (G) of the support member (4) are so selected, that the velocity component (K2), oriented in the direction (B) of vehicle advance, of the strand (4b) facing the tail (1b) of the vehicle, is greater than the speed (V) of the conveyor belt.

8 Claims, 6 Drawing Sheets

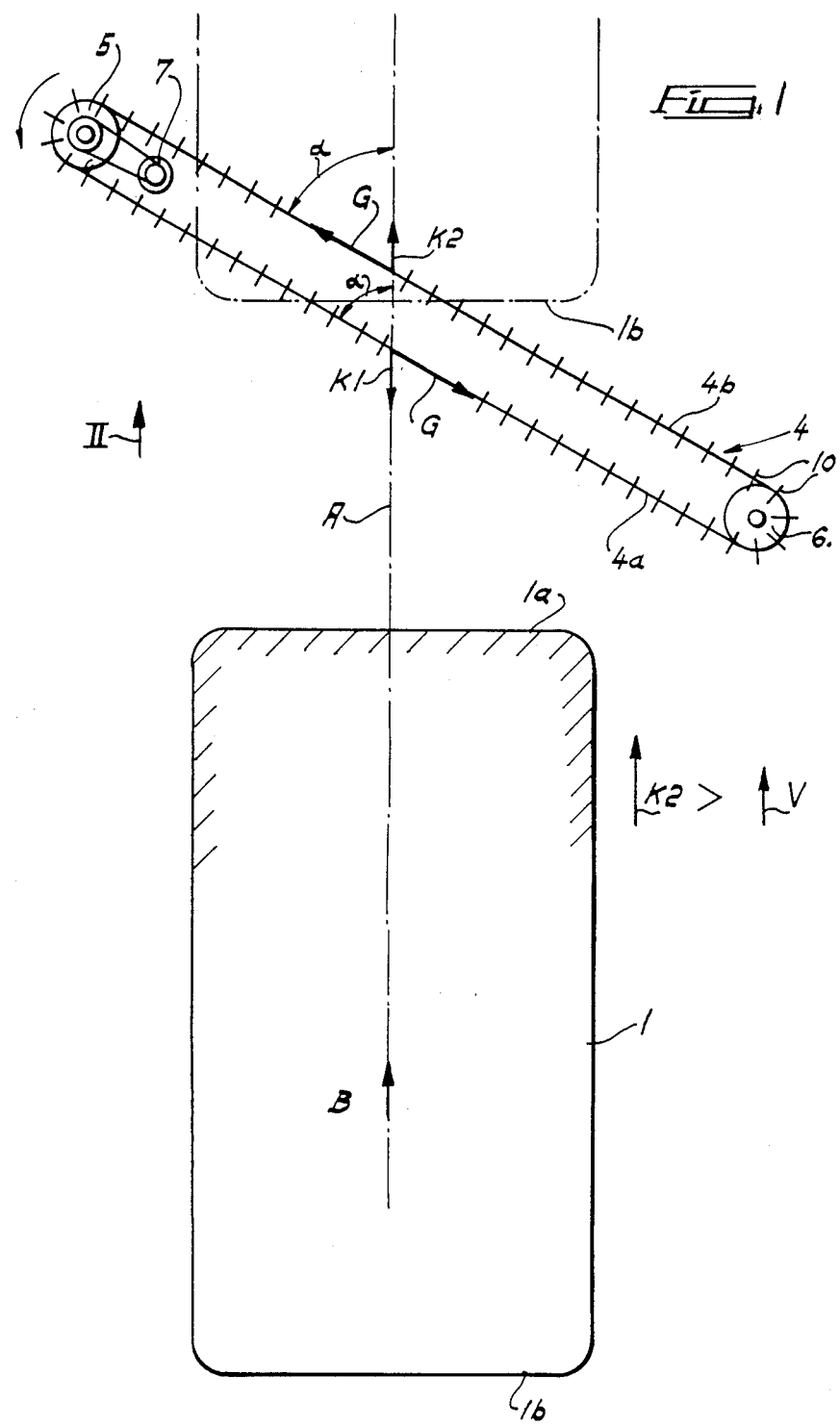

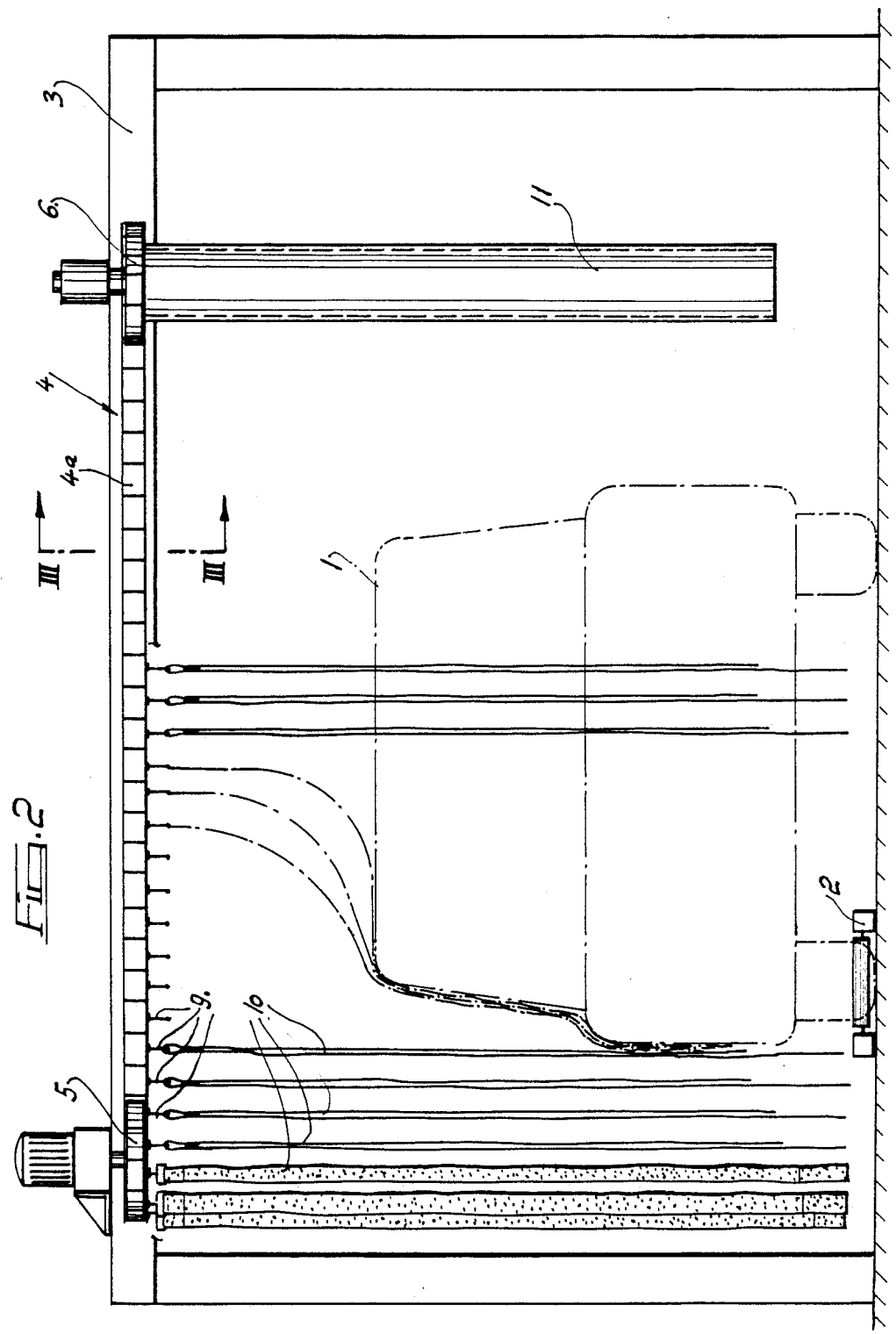

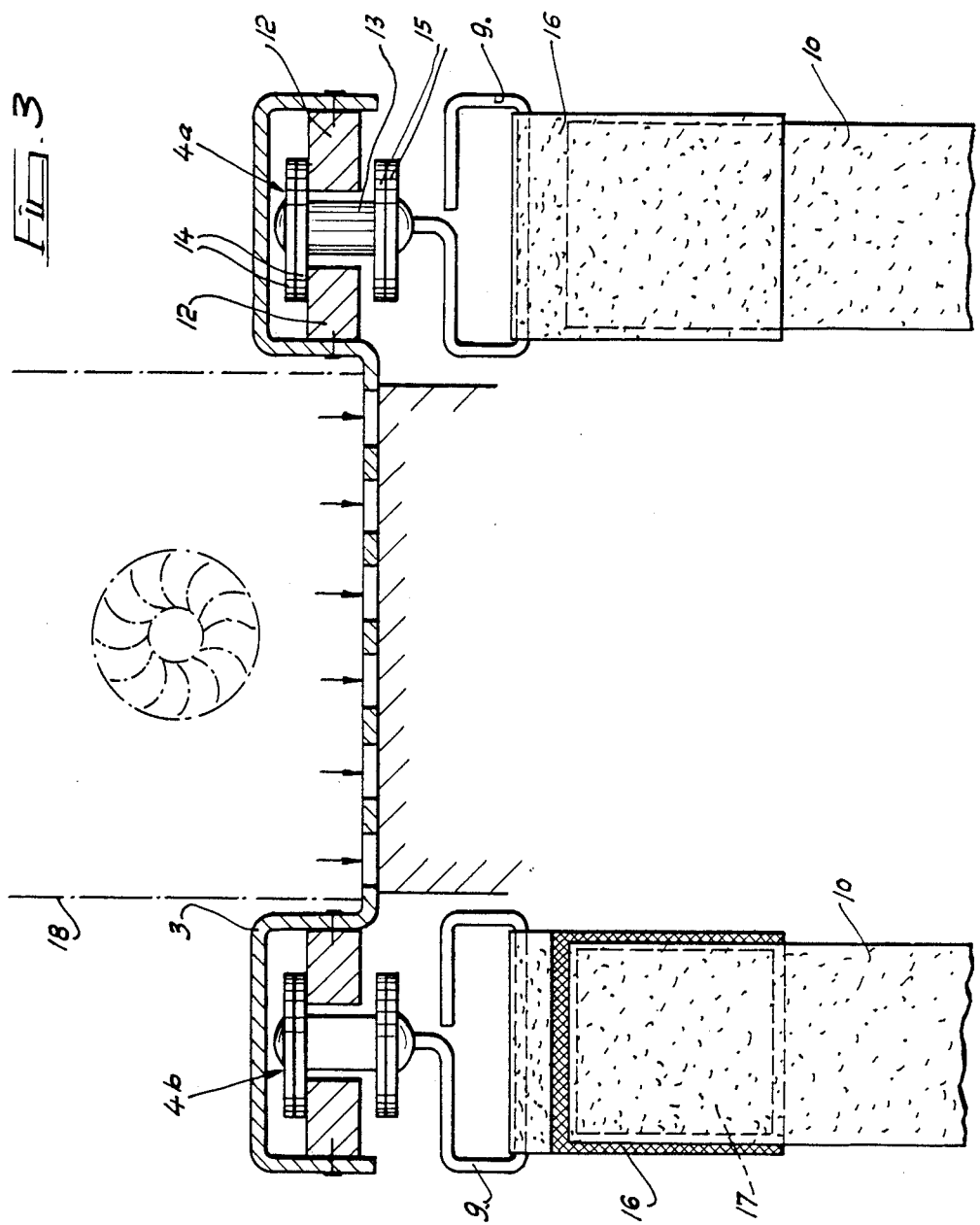

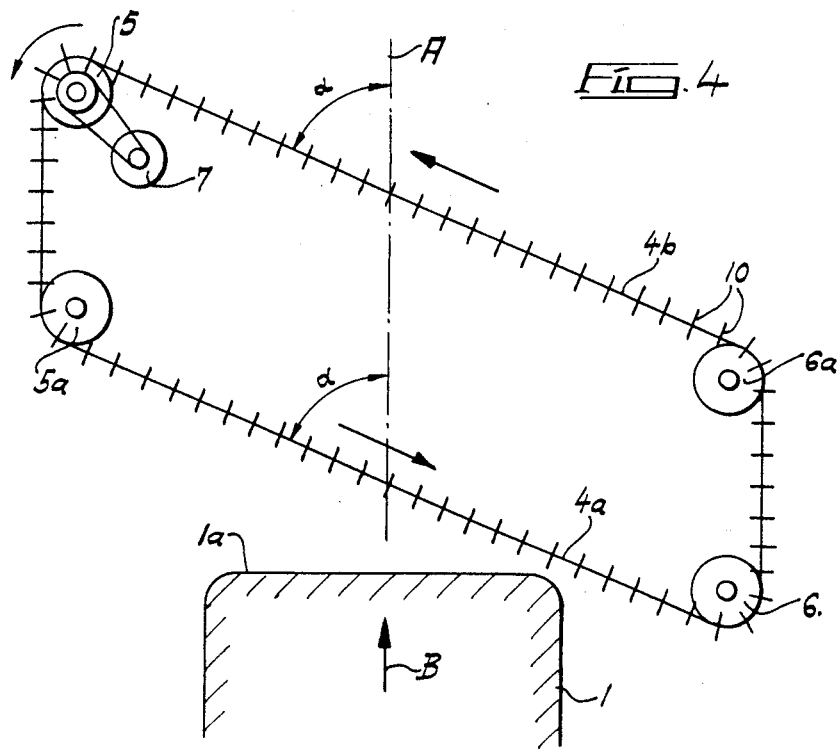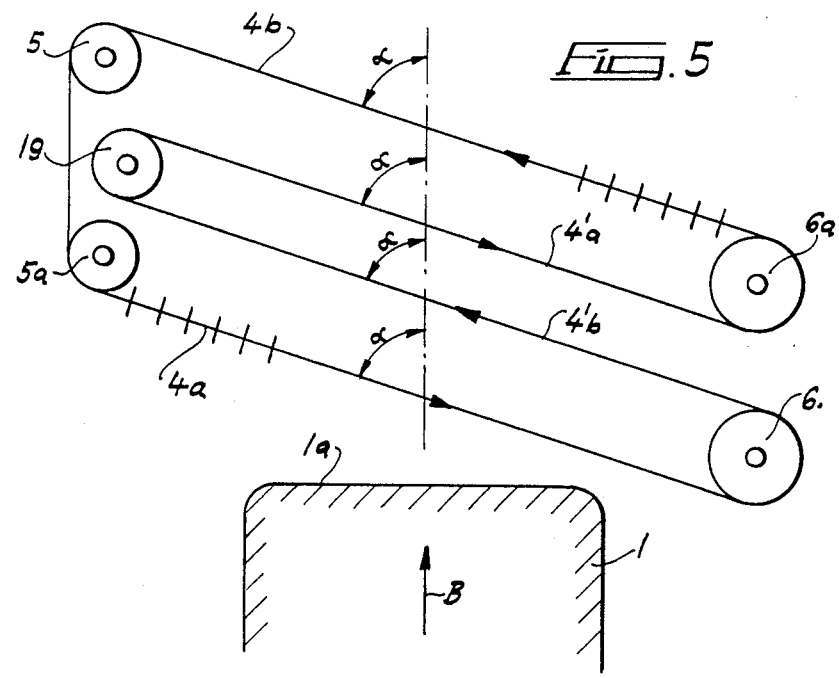

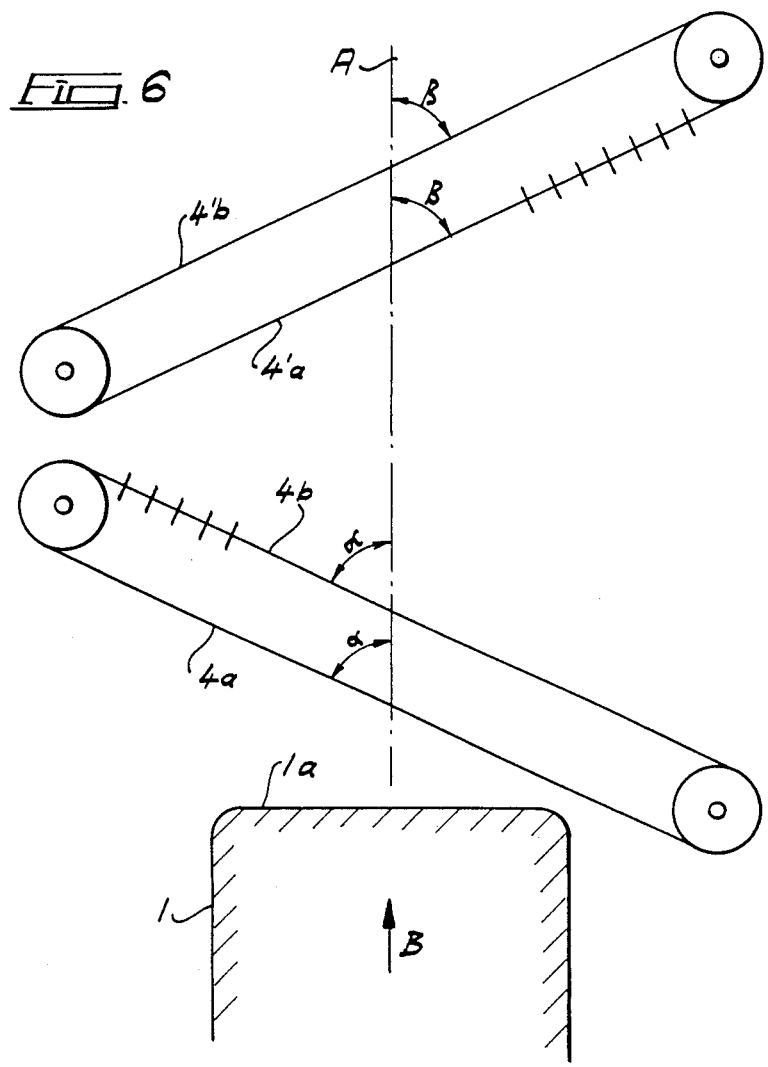

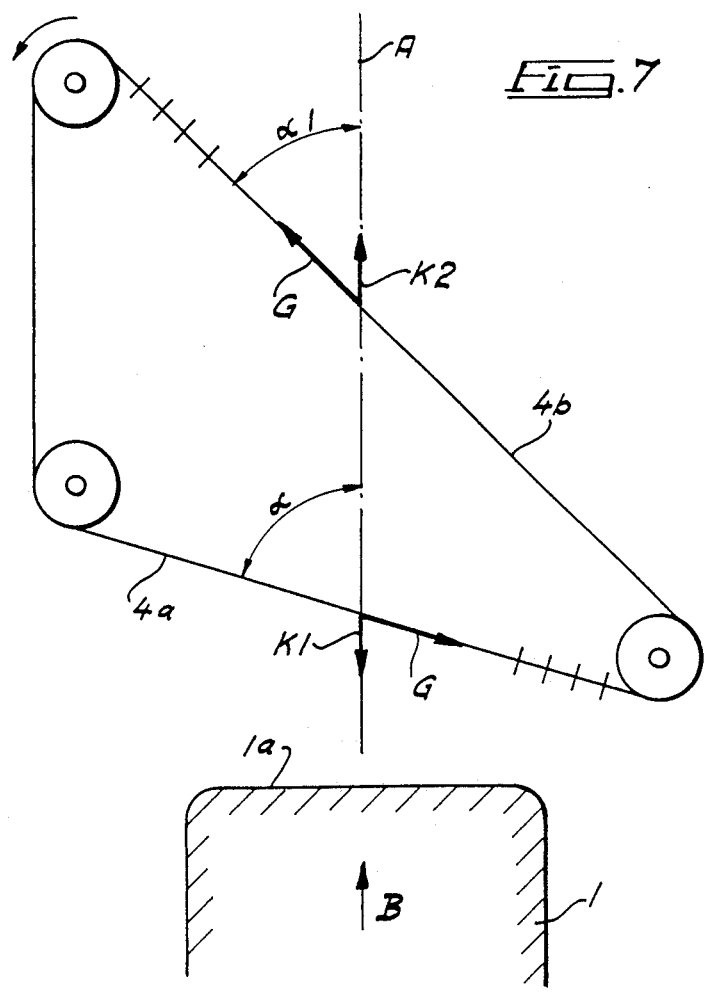

APPARATUS FOR WASHING OR DRYING VEHICLES

FIELD OF THE INVENTION

The invention relates to an apparatus for washing or drying vehicles, with a conveyor belt or the like drawing the vehicle through the apparatus, with a flexible, unidirectionally drivable support member which, in a horizontal plane above the plane of movement of the vehicle, is guided over a plurality of guide wheels arranged on both longitudinal sides of the apparatus to be rotatable about vertical axes, and with a multiplicity of narrow strips of absorbent material such as textiles, foam plastic, leather and leather-like plastic hanging vertically from said support member, in which at least two strands of the support member extend obliquely at an angle to the direction of movement of the vehicle and the strand facing the front of the vehicle is driven in a direction which has a velocity component oriented against the direction of movement of the vehicle.

BACKGROUND OF THE INVENTION

In a known vehicle-drying apparatus of this type, the flexible support member: is constructed as a chain, which is guided over three return wheels. Two of these return wheels are arranged one behind the other in the direction of movement of the vehicle on a longitudinal side of the apparatus, whilst the third return wheel is located on the other longitudinal side. The two strands of the support chain extending obliquely to the direction of movement of the vehicle are arranged obliquely opposite each other relative to the direction of movement of the vehicle and form two sides of an equilateral triangle. Herein, that strand of the support chain which faces towards the rear of the vehicle is so inclined relative to the direction of movement of the vehicle, that in its movement it has a velocity component oriented opposite the direction of movement of the vehicle. The consequence of this is that the strips drawn across the rear of the vehicle can only insufficiently dry the rear portion of the vehicle. Thus, whilst the vehicle is moved continuously forward by the conveyor belt in the direction of movement of the vehicle, the strand of the support chain facing the rear of the vehicle moves obliquely rearward oppositely to the direction of movement of the vehicle. The same movement is executed by the strips hanging from the support chain. Owing to this, not only is the contact time between the strips and the rear of the vehicle shortened, but the strips apply to a few spots on the vehicle rear. This contact deteriorates more and more as the steepness of the ear configuration of the vehicle increases.

Apparatuses of the type described in the foregoing are used not only for drying vehicles, but, with a very similar structure, also for washing vehicles. If now the aforedescribed known drying apparatus were to be employed for washing a vehicle, the washing efficiency would be unsatisfactory for the reason stated above.

The invention therefore has for its object the provision of a vehicle-washing or drying apparatus of the type mentioned at the outset, by means of which the entire vehicle, in particular also its rear portion, can be faultlessly washed or dried without additional expenditure.

SUMMARY OF THE INVENTION

This is achieved according to the invention in the manner whereby that strand of the support member which faces the rear of the vehicle is inclined at such an angle relative to the direction of movement of the vehicle, that during its motion it has a velocity component oriented in the direction of movement of the vehicle and that this angle and the speed of the support member are so selected, that the velocity component of the strand facing the rear portion of the vehicle and oriented in the direction of movement of the vehicle is greater than the speed of the conveyor belt.

By means of the novel apparatus, the rear portion of the vehicle can also be faultlessly washed or dried. Owing to the particular oblique inclination of the strand facing the rear portion of the vehicle it is achieved that the support member and thus also the strips connected therewith are moved forward during the continued motion of the vehicle in the direction of its travel and obliquely relative thereto. Since the velocity component of the strand facing the rear of the vehicle, which is oriented in the direction of movement of the vehicle, is greater than the speed of the conveyor belt, the strips are drawn in succession also over the higher-located portions of the tail, obliquely relative to the vehicle and in forward direction. This ensures the desired faultless washing or drying effect on the rear portion of the vehicle as well.

BRIEF DESCRIPTION OF THE DRAWINGS

Advantageous developments of the invention will now be explained in more detail with reference to the examples of embodiment illustrated in the drawing, in which:

FIG. 1 shows a plan view of the apparatus in a diagrammatic presentation;

FIG. 2 shows a front elevation of the apparatus in the direction of arrow II in FIG. 1;

FIG. 3 is a cross-section taken along the line III—III in FIG. 2; and

FIGS. 4–7 illustrate plan views of further forms of embodiment.

DETAILED DESCRIPTION

The vehicles 1 are moved through the apparatus in the direction of travel B in a known manner by means of a conveyor belt, in succession and at a distance from each other. On a horizontal crossbeam 3, which is located above the trajectory of the vehicle 1 to be washed or dried, an endless, flexible support member 4, which is expediently a sprocket chain, is guided over return wheels 5, 6 arranged on the two longitudinal sides of the apparatus. The return wheel 5 is driven by the motor 7 and an interconnected gearing 8. The support member has connected therewith a multiplicity of brackets 9 which in turn carry narrow strips 10 of an absorbent material, such as textiles, foam plastic, leather or leather-like plastic.

Between the two return wheels 5, 6 the support member extends in two straight strands 4a and 4b. These two strands are each arranged with oblique inclination at an angle $\alpha$ relative to the direction of movement B of the vehicle and thus to the longitudinal axis of the apparatus. The two strands 4a, 4b, which extend advantageously parallel to each other, are inclined at an angle $\alpha$ of approximately 60° relative to the direction of movement of the vehicle.

It is now an essential condition that the drive of the endless support member is operated in the direction and with the speed hereinafter described relative to the transport velocity of the conveyor belt 2. The return wheel 5 is driven by the motor 7 in counter-clockwise direction with a speed G. Since the trajectory of the strand 4a facing the front 1a of the vehicle extends obliquely relative to the direction B of the movement of the vehicle, the strand 4a also has a velocity component K1, which is oriented opposite to the direction of movement of the vehicle. Conversely, the strand 4b which during advance of the vehicle 1 faces the tail 1b has a velocity component K2 oriented in the direction o vehicle advance. The angle α and the velocity G of the support member must then be so selected, that the velocity component K2 oriented in the direction of vehicle advance is greater than the speed V of the conveyor belt.

Within the terms of this invention, that strand 4a of the flexible support member 4 under which the vehicle first passes, will be designated as "the strand 4a facing the front 1a of the vehicle", whilst the strand 4b, which subsequently passed secondly by the vehicle, will be designated as "the strand 4b facing the tail 1b of the vehicle".

By means of the strips hanging from the strand 4a the front 1a of the vehicle as well as the left lateral surfaces and the horizontally extending surfaces of the vehicle will be washed or dried in particular. The initially vertically downward-hanging strips apply in succession against the front face and then against the left lateral surface of the vehicle and, in the course of continued advance of the vehicle and of the strand 4a, are drawn over the vehicle surface. The strips 10 hanging from the strand 4b facing the tail 1b of the vehicle initially apply in succession against the right lateral surface of the vehicle and are then drawn over the horizontal surfaces of the vehicle. When the vehicle has almost completely traversed the apparatus, the strips hanging from strand 4b also apply to the tail 1b of the vehicle. Since the velocity component K2 is greater than the speed V of the conveyor belt, the strips initially applying against the lower tail parts are drawn forward over the entire tail portion of the vehicle and provide for a thorough cleaning or drying of the tail portion. The smaller the angle α, the more thorough the cleaning or drying of the vehicle front 1a and vehicle tail 1b. In order to ensure an equally efficient treatment of the lateral surfaces of the vehicle, it is important to ensure that the strips 10, after being drawn over the horizontal surfaces of the vehicle, again fall into a downward-hanging vertical position and do not remain adhering to the vehicle itself. For this reason, the return wheels 5, 6 should be at a substantial distance from the lateral surfaces of the vehicle, which distance approximately equals the length of the strips.

Should it not be possible to arrange the return wheels at such a large distance from the lateral surfaces of the vehicle, then a pipe 11 of relatively large diameter may be arranged underneath each of the return wheels 5, 6, which pipe rotates together with the associated return wheel. This pipe 11 will then ensure the complete withdrawal of the strips from the vehicle.

As is apparent from FIG. 3, the support member 4 is expediently constructed as a sprocket chain. For guiding and supporting each strand 4a, 4b, there are provided on the cross-member 3 two guide rails 12 each, extending parallel to each other. These guide rails 12 engage in the region of the link pins 13 between the chain side bars 14, 15. The upper side bars 14 are supported on the guide rails 12.

The support brackets 9 are suspended on the support member 4 with a spacing of approximately 10 cm. Each bracket 9 expediently carries one part 16 of a cling closure, the other part 17 of which is arranged on the upper end of the strip. The cling closure allows a replacement of strips which have to be removed from the brackets 9 for cleaning or in case of damage. The cling closure also opens up if a strip gets stuck on the vehicle.

When using the apparatus as a washing apparatus, it is necessary to give the vehicle a good pre-wash with large amounts of water under as high pressure as practicable and with the assistance of detergent substances. The remaining residual dirt can be loosened by a light contact with the strips 10 and subsequently rinsed off. Particularly suitable for this purpose are strips of a soft textile material which does not absorb much dirt. For greater efficiency, the strips may be sprayed with foam and water. The water also ensures the that no dirt particles settle out in the textile material. To intensify the application of the strips against the vehicle surface, water jets may in particular be arranged in the region of the door sill, which press the strips against the vehicle surface.

When the apparatus is to be used for the drying of vehicles, the strips should be highly absorbent. In practical applications, the vehicles are pre-dried by blowers to such an extent prior to the drying operation by the strips that the strips have only residual water to absorb. The dewatering of the strips will be dependent on the extent of pre-drying. This dewatering can can in most cases dispensed with, since evaporation by the ambient air will suffice. Under conditions of high atmospheric humidity there may be provided a hot-air blower 18 arranged on the cross-member 3 to produce an an air stream directed downwards onto the strips 10. The warm air stream can also be conveyed through additional conduits so that the strips are more intensely pressed against the vehicle surface. The dewatering of the strips can also be effected by other known means, such as pressing or suction.

In FIGS. 4 to 7 further possibilities for the guidance of the support member are shown. The essential feature here is that the direction in which the individual strands 4a, 4b are driven and the angle α or β, respectively, are each so selected in the above-described manner, that the strand 4a facing the front the vehicle always has a velocity component oriented opposite the direction of vehicle advance, while the strand 4b facing the tail of the vehicle has a velocity component which is oriented in the direction of movement of the vehicle. In addition, the velocity component of the strand 4b facing the tail of the vehicle must in all cases be greater than the speed V of the conveyor belt.

In the example of embodiment shown in FIG. 4, two return wheels 5, 5a, 6, 6a, respectively are provided on each longitudinal side of the apparatus and are spaced relative to each other in the direction B of vehicle advance. Owing to this, the strips moving in opposite direction on the two strands 4a and 4b have a wider spacing and cannot impede each other. In addition, the strips are more easily removed from the vehicle surface.

In the example of embodiment illustrated in FIG. 5, by the addition of a further return wheel 19 two additional strands 4'a and 4'b are formed, by which means the washing or drying efficiency may be doubled by comparison with the previously described examples of embodiment.

A still better working efficiency can be achieved by the serial arrangement, shown in FIG. 6, of two separate apparatuses of the type described in FIGS. 1 to 3, in which the strands 4'a and 4'b of the second apparatus are inclined at oppositely directed angles β relative to the direction B of vehicle movement. This arrangement allows to wash or dry those parts of the vehicle which have not yet been treated or only insufficiently so by the first apparatus.

The example of embodiment illustrated in FIG. 7 is intended to explain how, with unchanged driving velocity of the support member 4, the velocity component K2 oriented in the direction B of vehicle advance of the strand 4b facing the tail of the vehicle can be increased relative to the velocity component K1 oriented opposite to the direction B of vehicle advance of the strand facing the front of the vehicle, by reducing the angle α1 which the strand 4b forms with the direction B of vehicle advance relative to the angle α formed by the strand 4a with the direction of movement of the vehicle.

I claim:

1. An apparatus for washing or drying vehicles, comprising: a conveyor belt having means for drawing the vehicle through the apparatus at a conveying speed, a flexible, unidirectionally drivable, endless support member which, in a horizontal plane above the plane of movement of the vehicle, wraps around and is guided over a plurality of return wheels arranged on both longitudinal sides of the apparatus to be rotatable about respective vertical axes, said endless support member being drivingly engaged with said return wheels and movable therewith in response to rotation thereof, motor means for effecting rotation of said return wheels and movement of said endless support member at a predetermined speed, and a multiplicity of narrow strips of absorbent material connected to and hanging vertically from said endless support member, said endless support member being apportioned by said return wheels into a plurality of strands defined by respective portions of said endless support member which extend between respective pairs of said return wheels, in which at least two of said strands of said endless support member extend obliquely relative to a direction of vehicle advance, one of said obliquely extending strands being offset from the other of said strands in the direction of vehicle advance, said other strand facing the front of the vehicle first and being inclined relative to the direction of vehicle advance so that said other strand, when moved by said motor means, will have a velocity component oriented opposite to the direction of vehicle advance, said one strand of said endless support member facing the tail of the vehicle last and being inclined at such an angle relative to the direction of vehicle advance that it has in its motion a velocity component oriented in the direction of vehicle advance, said angle and the predetermined speed at which said endless support member is driven by said motor means defining a magnitude of said velocity component of said one strand, said magnitude being greater than the conveying speed of said conveyor belt.

2. The apparatus according to claim 1, wherein the angle formed by said one strand relative to the direction of movement of the vehicle is approximately 60° or smaller.

3. The apparatus according to claim 1, wherein said two strands extend parallel to each other.

4. The apparatus according to claim 1, wherein said endless support member is constructed as a sprocket chain including a plurality of side bars arranged in parallel rows, and chain pins extending between said rows of side bars and connecting respective adjacent pairs of said side bars in one of said parallel rows to corresponding adjacent pairs of said side bars in the other of said parallel rows, and wherein, for guiding and supporting each said strand, two guide rails extending parallel to each other are provided which, in the region of said chain pins, engage between said rows of side bars.

5. The apparatus according to claim 1, wherein, for each said strip, a support bracket is suspended on said endless support member, and wherein each said support bracket carries one part of a cling closure, the other part of which is arranged at an upper end of the associated strip.

6. The device according to claim 1, wherein said endless support member is guided over four of said return wheels, two of which are arranged on each longitudinal side of the apparatus.

7. The apparatus according to claim 1, wherein said endless support member is guided in at least four of said strands extending obliquely relative to the direction of vehicle advance repeatedly from one longitudinal side to the other of the apparatus.

8. The apparatus according to claim 1, wherein, in the region of said endless support member, a hot air blower is provided for generating an air stream directed downwards onto said strips.

* * * * *